United States Patent
Webster (10) Patent No.: US 6,543,992 B2
(45) Date of Patent: Apr. 8, 2003

(54) CONTROL ARRANGEMENT

(75) Inventor: John R Webster, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 09/866,768

(22) Filed: May 30, 2001

(65) Prior Publication Data

US 2002/0001519 A1 Jan. 3, 2002

(30) Foreign Application Priority Data

Jun. 23, 2000 (GB) .............................................. 0015303

(51) Int. Cl.$^7$ ................................................ F01B 25/00
(52) U.S. Cl. ........................ 415/10; 415/173.1; 415/26; 415/47
(58) Field of Search ................................ 415/10, 173.1, 415/173.2, 173.3, 26, 47, 48

(56) References Cited

U.S. PATENT DOCUMENTS

| | | | | |
|---|---|---|---|---|
| 5,181,971 A | * | 1/1993 | Ohtsuka | 148/103 |
| 5,294,757 A | * | 3/1994 | Skalski et al. | 187/115 |
| 5,430,519 A | * | 7/1995 | Shimada et al. | 354/271.1 |
| 5,692,882 A | * | 12/1997 | Bozeman, Jr. et al. | 417/45 |
| 5,818,131 A | * | 10/1998 | Zhang | 310/15 |
| 6,015,272 A | * | 1/2000 | Antaki et al. | 417/356 |
| 6,244,835 B1 | * | 6/2001 | Antaki et al. | 417/356 |
| 6,250,880 B1 | * | 6/2001 | Woodard et al. | 415/182.1 |
| 6,273,671 B1 | * | 8/2001 | Ress, Jr. | 415/1 |
| 6,299,410 B1 | * | 10/2001 | Hilbert et al. | 416/145 |
| 6,363,276 B1 | * | 3/2002 | Prem et al. | 607/6 |
| 6,375,411 B1 | * | 4/2002 | Ham et al. | 415/10 |
| 6,375,607 B1 | * | 4/2002 | Prem | 600/17 |

FOREIGN PATENT DOCUMENTS

| | | |
|---|---|---|
| EP | 0 054 617 A | 6/1982 |
| EP | 0 191 225 A | 8/1986 |
| GB | 1 518 228 SP | 7/1978 |
| GB | 1 552 912 SP | 9/1979 |

* cited by examiner

Primary Examiner—Edward K. Look
Assistant Examiner—James M McAleenan
(74) Attorney, Agent, or Firm—W. Warren Taltavull; Manelli Denison & Selter PLLC

(57) ABSTRACT

A control arrangement (34) for controlling the size of a gap (30) between first and second components. The control arrangement comprises first magnet means (38) to be provided on the first component, and second magnet means to be provided on the second component. The first and second magnet means are in magnetic interaction with each other across the gap (30) and the arrangement further includes control means (36) to control the size of the gap (30) the first magnet means (38) is a moveable in a first direction to cause the control means (36) to effect relative movement of the first and second components to increase the gap (30) and in a second direction to cause the control means (36) to effect relative movement of the first and second components to decrease the gap (30). The first and second magnet means are arranged such that relative movement of the first and second components towards each other moves the first magnet means (38) in the first direction, and relative movement of the first and second components away from each other moves the first magnet means (38) in the second direction.

28 Claims, 6 Drawing Sheets

CONTROL ARRANGEMENT

FIELD OF THE INVENTION

This invention relates to control arrangements for controlling the size of a gap between first and second components. More particularly, but not exclusively, the invention relates to control arrangements for controlling the size of a gap between rotating and static components in a gas turbine engine.

BACKGROUND OF THE INVENTION

Turbines and compressors in gas turbine engines have components which rotate at relatively high speeds and which are exposed to pressurised gases. Gaps are defined between the rotating and static components, and these are required to be as small as possible in order to minimise the leakage of the gases. The degree of leakage can have a significant effect on the overall efficiency of a gas turbine engine. Various ways have been proposed for minimising the leakage through the gaps, for example by the use of materials with different coefficients of thermal expansion, or by the use of seals, for example labyrinth seals, abradable seals, brush seals, or leaf seals.

SUMMARY OF THE INVENTION

According to one aspect of this invention, there is provided a control arrangement for controlling the size of a gap between first and second components, the control arrangement comprising first magnet means on the first component, and second magnet means on the second component, the first and second magnet means being in magnetic interaction with each other across the gap, and the arrangement further including control means in operative association with the first magnet means to control the size of the gap, wherein variations in magnetic flux across the gap cause the first magnet means to cause the control means to effect relative movement of the first and second components to vary the size of the gap.

Preferably, the first magnet means is moveable in a first direction to cause the control means to effect relative movement of the first and second components to increase the gap and in a second direction to cause the control means to effect relative movement of the first and second components to decrease the gap, the first and second magnet means being so arranged that relative movement of the first and second components towards each other moves the first magnet means in the first direction, and relative movement of the first and second components away from each other moves the first magnet means in the second direction.

The phrase "magnet means" as used herein is intended to cover the situation where the magnet means comprises either a magnet, or an electrically conductive material in which a magnetic field can be established on changes in magnetic flux therethrough.

The first magnet means may include biasing means to bias the first magnet means in the second direction. The biasing means may comprise resilient urging means, for example, a spring.

Each of the first and second magnet means may comprise a magnet or magnetic material. The magnets may be permanent magnets. Alternatively, one of the first and second magnet means may comprise a magnet or magnetic material and the other of the first and second magnet means may comprise an electrically conductive material, whereby movement of the first and second magnet means relative to each other establishes a magnetic field in the electrically conductive material. Preferably, the first magnet means compresses a magnet or magnetic material and the second magnet means comprises an electrically conductive material.

In a first embodiment, the first and second magnet means are arranged such that they move transversely relative to each other and they may be arranged to repel each other. In a second embodiment, the first and second magnet means are arranged such that, on relative movement of said first and second components transverse to the gap, a force is applied to at least one of said first and second magnet means generally parallel, or generally tangential, to the direction of said relative movement.

This invention is particularly suitable for use in rotary apparatus for gas turbine engines, for example in the turbine and compressor sections of such engines. Such rotary apparatus typically includes a rotor, for example turbine or compressor rotor blades, and a stator, for example stator vanes, nozzle guide vanes, and a casing, wherein the rotor rotates relative to the stator. In such apparatus, one of the first and second magnet means is provided on the stator means, and the other of the first and second magnet means is provided on the rotor means. Conveniently, the first magnet means is provided on the stator means, and the second magnet means is provided on the rotor means. Where the second magnet means is an electrically conductive material, the second magnet means may comprise at least some of the material from which the rotor or stator means is formed. Alternatively, the electrically conductive material may be separate electrically conductive members incorporated into the rotor or stator means.

The second component preferably comprises a rotor carrying a plurality of rotor blades. In one embodiment, the first component forms part of a stator casing, the first magnet means being provided on the stator casing, and the second magnet means being provided at the radially outer ends of the rotor blades. In another embodiment, the first component forms part of a stator vane, the first magnet means being provided at a radially inner end of each stator vane, and the second magnet means is provided on the rotor.

The first magnet means may be pivotally mounted to the first component. The first magnet means may be in the form of a magnetic yoke, and the second magnet means may comprise a protrusion extending between the arms of the yoke. The control means in this embodiment may be in the form of a valve to control the flow of fluid in or out of a chamber.

In one embodiment, the control means may be a pneumatic or an hydraulic control means, which may include a chamber to receive a force transmission fluid, one wall of the chamber constituting the first component and the chamber having at least one inlet means through which the fluid can pass. Preferably, the first magnet means is moveable to open or close the inlet means. The chamber may also be provided with outlet means through which the fluid may exit the chamber. Thus, in this embodiment, changes of pressure in the chamber can move the first component towards or away from the second component.

In another embodiment, the control means may comprise a thermo-deformable member and temperature control means for heating and cooling the thermo-deformable member, movement of the first magnet means, causing the temperature control means to either heat or cool the thermo-deformable member, to deform said member to effect relative movement of the first and second components to decrease or increase the gap.

The temperature control means may comprise conduits connected in fluid communication with respective supplies of hot and cold fluid, such as a gas. In this embodiment, the first magnet means may be connected to a valve means to control the flow of hot and cold fluid onto the thermo-deformable member.

In one embodiment, the thermodeformable member comprises a bi-metallic member. In another embodiment, the thermo-deformable member comprises a shape memory alloy, which may be a one-way shape memory alloy or a two-way shape memory alloy.

Where the thermo-deformable member is a bi-metallic member or a two-way shape memory alloy member, heating or cooling the bi-metallic or the shape memory alloy member causes said member to deform to effect relative movement of the first and second components to increase or decrease the gap and respective cooling or heating the bi-metallic or shape memory alloy member causes said member to deform to effect relative movement of the first and second components in the opposite direction.

Where the thermo-deformable member is a one-way shape member alloy member, heating or cooling the member causes the member to deform to effect relative movement of the first and second components to increase or decrease the gap. This embodiment may further include force applying means to apply a force to the member or the first component to effect relative movement of the first and second components in the opposite direction.

In another embodiment, which is suitable for use in controlling the gap between a second component in the form of fan blades of a gas turbine engine, and a first component in the form of a casing surrounding the fan blades, the control means comprises a chamber defined in the first component having resiliently deformable side walls, whereby the side walls urge a radially inner wall of the chamber towards or away from the second component. The chamber is preferably in fluid communication with a supply of a force transmission fluid to urge the radially inner wall in the opposite direction away from or towards the second component. Preferably, the side walls urge the radially inner wall away from the second component and the force transmission fluid urges the radially inner wall towards the second component.

The first magnet means may be arranged over an aperture in the chamber to control the flow of said fluid into or out of the chamber. The second magnet means may be provided on the second component, whereby as the gap between the first and second magnet means increases the first magnet means moves to open or close the aperture, thereby controlling the flow of fluid into the chamber to effect relative movement of the first and second components to decrease the gap, and as the gap between the first and second magnet means decreases the first magnet means may move in the opposite direction to close or open the aperture thereby controlling the flow of fluid into the chamber and increasing the gap.

BRIEF DESCRIPTION OF THE DRAWINGS

Embodiments of the invention will now be described by way of example only, with reference to the accompanying diagrammatic drawings, in which.

DETAILED DESCRIPTION OF THE INVENTION

Figure 1:
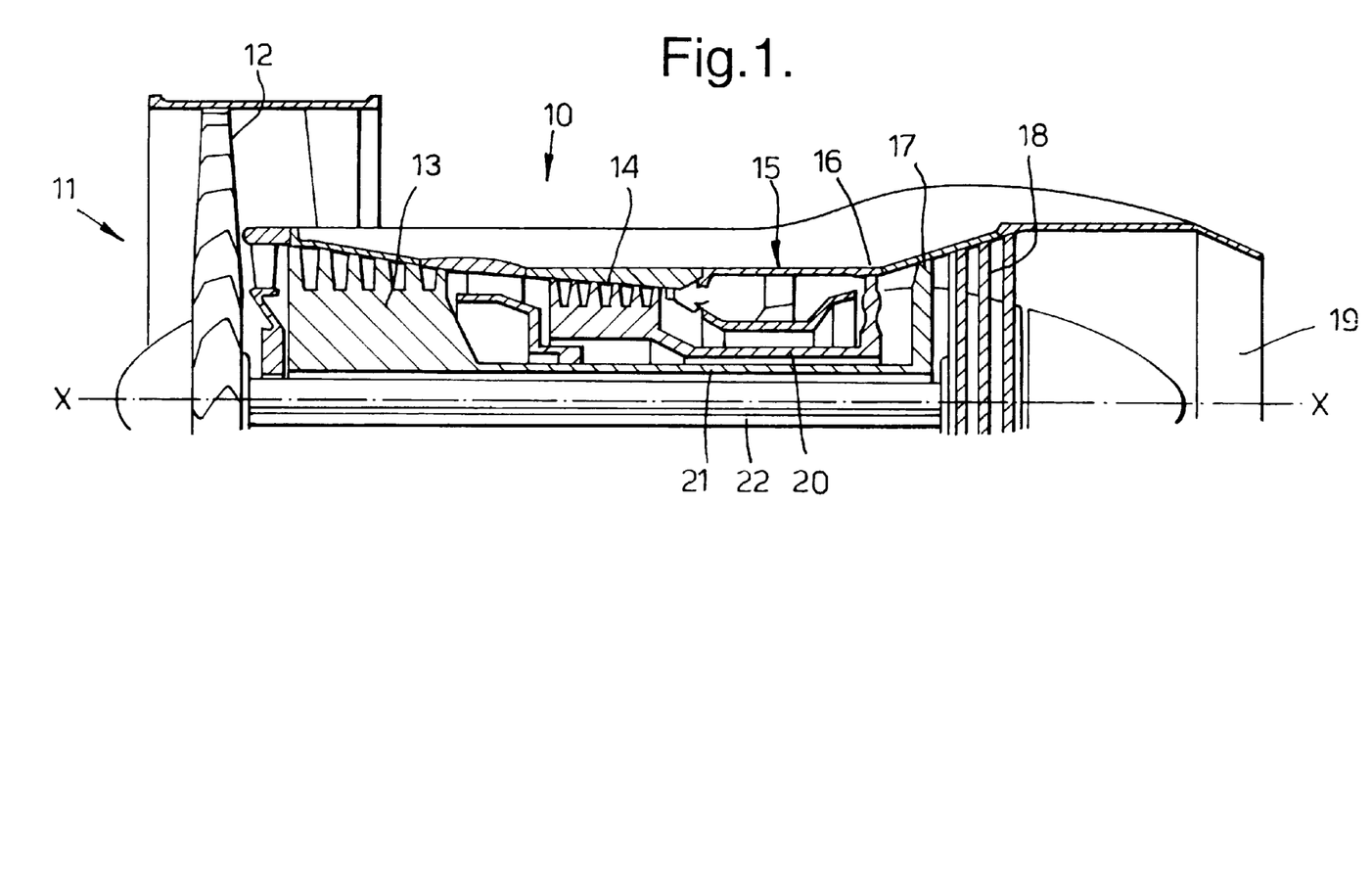
FIG. 1 is a sectional side view of the upper half of a gas turbine engine.

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produces two air flows: a first air flow into the intermediate pressure compressor 13 and a second air flow which provides propulsive thrust. The intermediate pressure compressor 13 compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts 20, 21 and 22.

Figure 2:
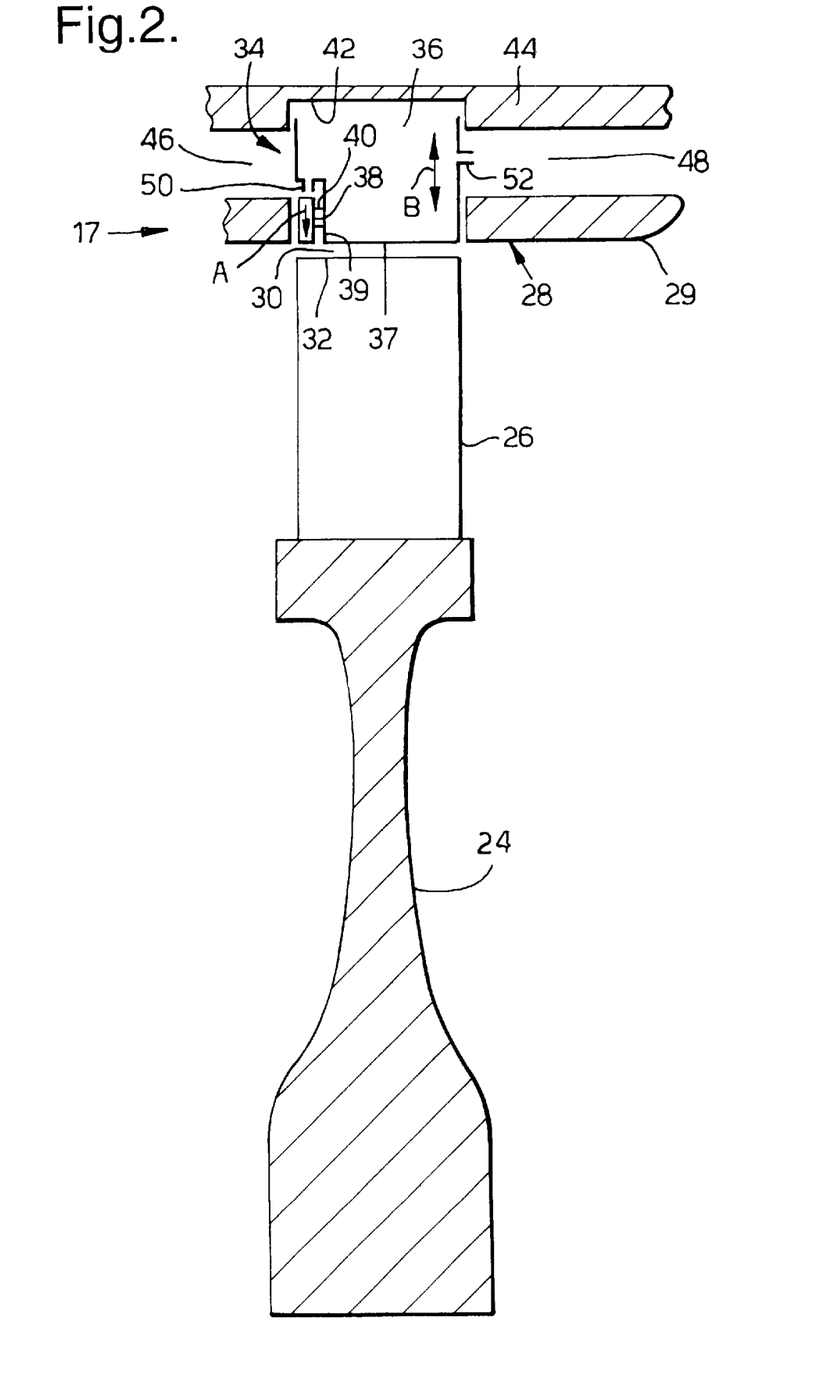
FIG. 2 is a diagrammatic sectional view of part of a gas turbine engine showing a control arrangement arranged in a radial position.

Referring to FIG. 2, there is shown a sectional view of part of the intermediate pressure turbine section 17 of the gas turbine engine 10. The intermediate pressure turbine section 17 comprises a turbine rotor 24 in the form of a turbine disc which carries a second component in the form of a plurality of circumferentially spaced and radially outwardly extending turbine blades 26. A casing 28 surrounds the turbine blades 26. The casing 28 carries a plurality of circumferentially spaced and radially inwardly extending stator vanes (not shown) which are located adjacent to, and upstream of, the turbine blades 26 and direct air to the turbine blades 26. The casing 28 comprises an inner wall 29 and a plurality of chambers 36 which are arranged in succession adjacent to each other circumferentially around, and in radial alignment with, the turbine blades 26. The chambers 36 are radially moveable towards and away from the turbine blades 26 as will be explained below.

A gap 30 is defined between the radially outer tips 32 of the turbine blades 26 and a first component in the form of a radially inner wall 37 of each chamber 36 of the casing 28.

The size of the gap 30 is controlled by a control arrangement 34 which includes the plurality of chambers 36 and first magnet means in the form of a magnet 38. One magnet 38 is mounted at a corner of each chamber 36 and is connected to a side wall 39 of the respective chamber 36 by urging means 40 which urge the magnet 38 radially inwardly towards the turbine blades 26 as indicated by the arrow A. The urging means 40 can be, for example, in the form of a spring or springs.

An outer wall 44 is provided radially outwardly of the inner wall 29 of the casing 28, and each chamber 36 is held within a recess 42 formed in the outer wall 44. Each chamber 36 is located between a high pressure region 46, defined between the outer and inner walls 44 and 29 of the casing 28 at the upstream end region of the chamber 36, and a low pressure region 48, defined between the outer and inner walls 44 and 29 of the casing 28 downstream of the chamber 36.

Each chamber 36 is provided with an inlet 50 to allow air to enter the chamber 36 from the high pressure region 46, and an outlet 52 to allow air to exit from the chamber 36 to the low pressure region 48. The magnet 38 is arranged in operative association with the inlet 50 and can be moved to open and close the inlet 50, as will be explained below.

The chamber 36 is moveable in radially inwards and outwards directions towards and away from the turbine blades 26 as indicated by the arrow B to increase or decrease the size of the gap 30.

The turbine blades 26 are made of an electrically conductive material and constitute a second magnet means. As the blades rotate past each magnet 38, eddy currents are established in the turbine blades 26 thereby creating a magnetic field. The magnetic field so generated repels the magnet 38 away from the turbine blades 26 i.e. in the direction opposite to the arrow A, towards the inlet 50. The distance between the tips 32 of the turbine blades 26 and the wall 37 of the chamber 36 varies due to the expansion and contraction of the turbine blades 26 and the casing 28 during operation.

When the gap 30 is decreased the repulsive force on the magnet 38 increases and the magnet 38 moves towards the inlet 50, thus closing the inlet 50. As the inlet 50 is closed, the supply of high pressure air to the chamber 36 is reduced and, may eventually be cut off depending on how close the tips 32 of each blade move towards the wall 37. The air inside the chamber 36 exits via the outlet 52 and, accordingly, the pressure inside the chamber 36 reduces. The pressure of the air flowing over the turbine blades, 26 acts on the chamber 36 to push it radially outwardly to increase the gap 30.

When the gap 30 increases, the repulsive force acting on the magnet 38 is decreased. The urging means 40 then moves the magnet 38 away from the inlet 50, thereby allowing or increasing the flow of high pressure air into the chamber 36. The pressure inside the chamber 36 thus increases and moves the chamber 36 towards the turbine blades 26 thereby decreasing the gap 30.

Under steady conditions of operation of the turbine 17, an equilibrium position of the chamber 36 will be established, thereby maintaining the gap 30 substantially constant.

Although the control arrangement 34 has been described in relation to the intermediate pressure turbine 17, it will be appreciated that it could also be applied in the low pressure turbine 18, the high pressure turbine 16, the high pressure compressor 14, or the intermediate pressure compressor 13.

Figure 3:
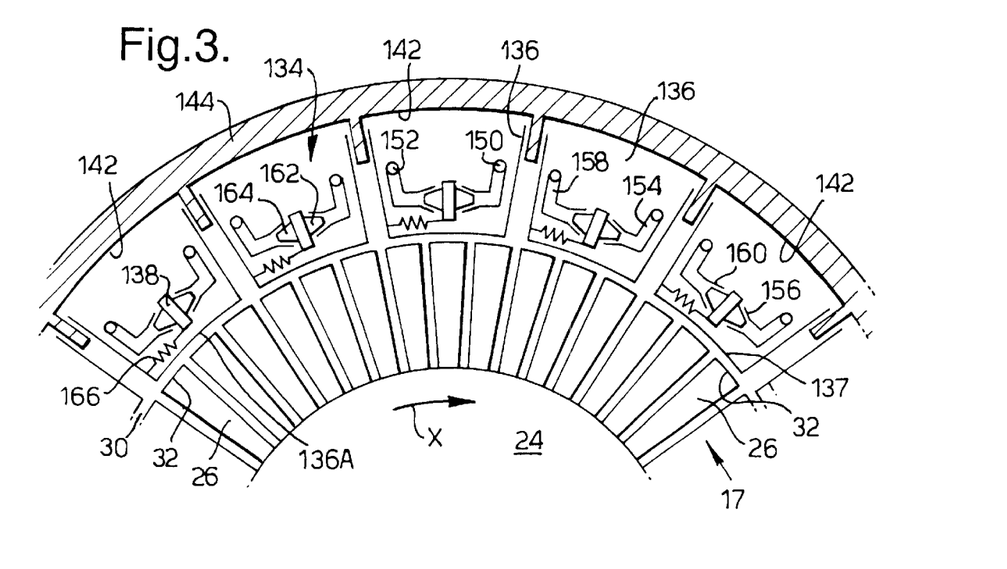
FIG. 3 is a front view of a part of a gas turbine engine showing another embodiment of a control arrangement.
Figure 4:
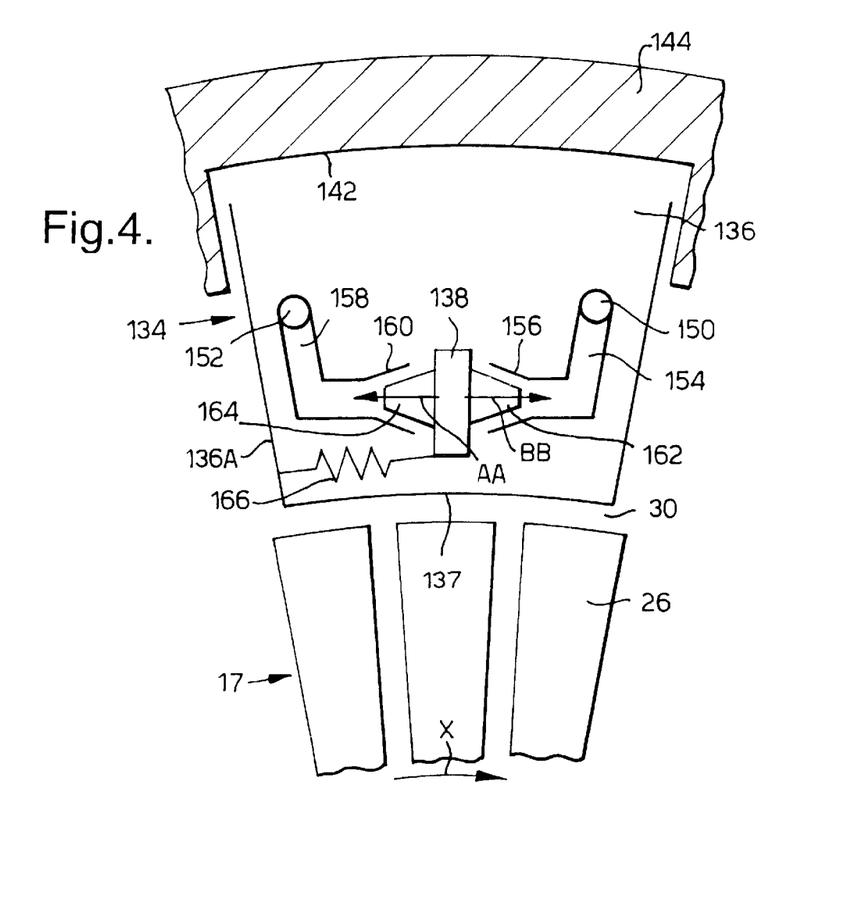
FIG. 4 is a close up view of the control arrangement shown in FIG. 3.

Referring to FIGS. 3 and 4, there is shown a further embodiment of a control arrangement which, again is shown in relation to the intermediate pressure turbine 17, but it could also be located in the high pressure turbine 16, the low pressure turbine 18, the high pressure compressor 14 or the intermediate pressure compressor 13. Again, the intermediate pressure turbine 17 comprises a turbine rotor 24 in the form of a turbine disc carrying at its circumference radially outwardly extending turbine blades 26. The turbine rotor 24 and turbine blades 26 rotate in the direction indicated by the arrow X.

A control arrangement 134 is provided including a plurality of chambers 136 extending circumferentially radially outwardly of the outer tips 32 of the rotor blades 26. The gap 30 is defined between the outer tips 32 and radially inner walls 137 of the chambers 136. Each chamber 136 is held within a recess 142 in an outer wall 144, and is radially moveable within the recess 142.

Each chamber 136 is connected to the adjacent high pressure region via an inlet 150, and to a low pressure region via an outlet 152. Air enters the chamber via the inlet 150 and exits via the outlet 152. An inlet conduit 154 extends from the high pressure inlet 150, and terminates in a valve seat 156. An outlet conduit 158 extends from a valve seat 160 to the outlet 152. A magnet 138 is provided between the valve seats 156, 160 and is provided with valve members 162, 164. The valve member 162 is of an appropriate size and shape to seat in the valve seat 156 to close the inlet conduit 154. Similarly, the valve member 164 is of a suitable size and shape to seat in the valve seat 160 and close the outlet conduit 158.

The magnet 138 is connected to a side wall 136A of the chamber 136 via urging means 166, for example in the form of a spring which applies a force to the magnet 138 in the direction to seat the valve member 164 on the valve seat 160, as indicated by the arrow AA (see FIG. 4).

Each of the turbine blades 26 is formed of an electrically conductive material and, as the turbine blades 26 rotate past each of the magnets 138, eddy currents are set up in the turbine blades 26 which create a magnetic field. As well as establishing a force repelling the magnet 138, the rotating blades also create a drag force on the magnet 138 in the direction to seat the valve member 162 on the valve seat 156, as indicated by the arrow BB, i.e. in the opposite direction to the force AA applied to the magnet 138 by the urging means 166.

In operation of the turbine 17, a decrease in the gap 30 will result in an increase in the drag force BB on the magnet 138 thereby moving the magnet towards the high pressure inlet valve seat 156. This restricts and may eventually cut off the flow of high pressure air into the chamber 136, reducing the pressure in the chamber 136. As a result, the chamber 136 moves radially outwardly to increase the gap 30.

An increase in the gap 30 reduces the drag force on the magnets 138 created by the rotation of the turbine blades 26 and the urging means 166 move the magnet 138 in the direction indicated by the arrow AA towards the valve seat 160. This restricts and may eventually close the outlet conduit 158 to prevent air from exiting the chamber 136. High pressure air continues to enter the chamber 136 via the inlet 150 and the pressure inside the chamber 136 increases thereby decreasing the gap 30. In steady operation of the turbine 17, an equilibrium position of the magnet 138 between the valve seats 156, 160 will be established to maintain the gap 30 substantially constant.

Figure 5:
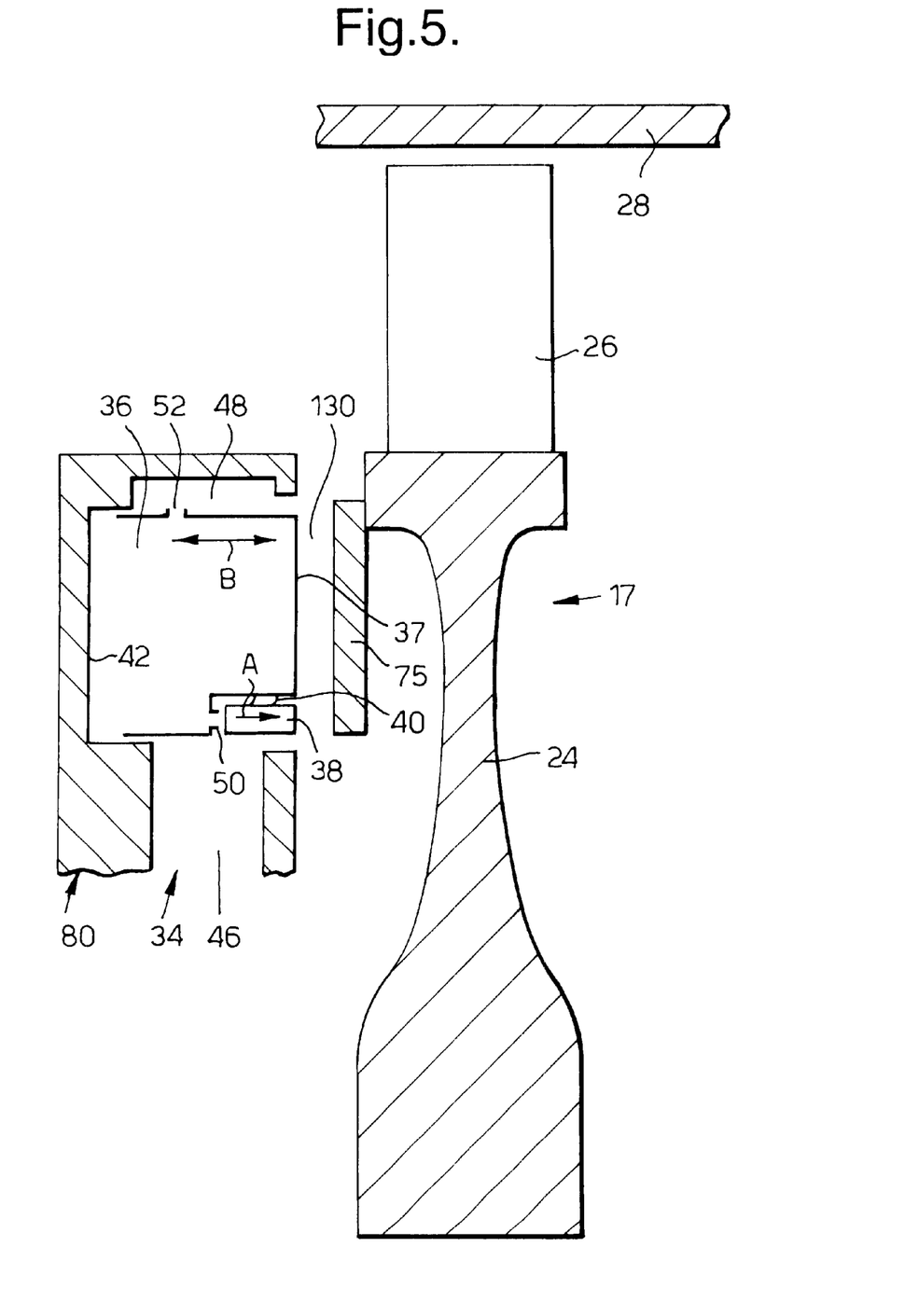
FIG. 5 is a view similar to FIG. 2 showing a control arrangement arranged in an axial position.

Referring to FIG. 5, there is shown a further embodiment for use in controlling axial movement of turbines. In this embodiment, a similar control arrangement to that shown in FIG. 2 is provided, and the same features have been designated by the same reference numerals. In this embodiment, it is desired to control the size of a gap 130 between an annular electrically conductive member 75 carried by the turbine rotor 24 and the wall 37 of each of the chambers 36 which are formed in a component 80 mounted upstream of the turbine rotor 24. A plurality of axially moveable chambers 36 are provided and are arranged in succession in an annular configuration around the principal axis of the turbine 17.

During operation of the turbine 17, the turbine rotor 24 may move towards the component 80, thereby decreasing the gap 130. Rotation of the electrically conductive member 75 by the rotation of the turbine rotor 24 causes eddy currents to be set up in the electrically conductive member 75 by virtue of its proximity to the magnets 38. This establishes a repulsive force on the magnet 38 in the direction opposite to the arrow A, which moves the magnet 38 towards the inlet 50 thereby restricting, and eventually preventing the flow of high pressure air into the chamber 36 from a high pressure region 46. Air in the chamber 36 exits via the outlet 52 to a low pressure region 48 thereby reducing pressure in the chamber 36 and allowing the chamber 36 to move in the upstream direction away from the rotor 24. In order to effect such movement of the chamber 36 away from the rotor 24, the pressure in the gap 130 may be sufficient to apply the necessary force or it may be necessary to provide urging means (not shown). The high and low pressure regions 46 and 48 may be any suitable such regions in the engine 10.

When the gap 130 increases, the repulsive force on the magnet 38 decreases and the urging means 40 moves the magnet away from the inlet 50 in the direction shown by the arrow A. High pressure air enters the chamber 36 from the high pressure region 46, thereby increasing the pressure inside the chamber 36 and moving the chamber 36 towards the electrically conductive member 75, thereby decreasing the gap 130. In steady operation of the turbine 17, an equilibrium position for the chamber 36 is established to maintain the gap 130 substantially constant.

It will be appreciated that a control arrangement similar to that disclosed with reference to FIGS. 3 and 4 could replace the control arrangement shown in FIG. 5.

In the embodiments shown in FIGS. 2 to 5 secondary seals (not shown) are provided between adjacent chambers 36 or 136, and between the chambers 36 or 136 and the parts of the wall 44 or 144 in the recesses 42 or 142. The secondary seals can be diaphragm seals, bellows seals, labyrinth seals, carbon seals, brush seals or any other suitable seal.

In the above embodiments, the chambers 36, 136 are slidable relative to the walls 44, 144. Alternatively, the chambers 36, 136 may be moveable relative to the walls 44, 144 by other means, for example, levers, leaf springs and pivots.

Figure 6:
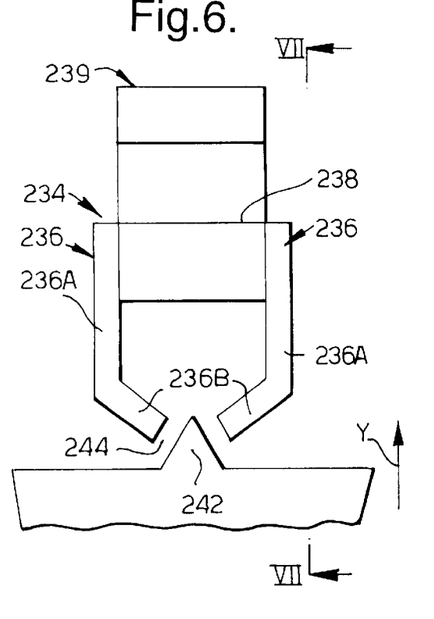
FIG. 6 is a diagrammatic view of another embodiment.
Figure 7:
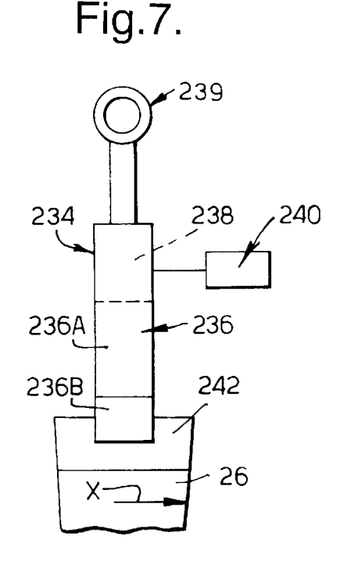
FIG. 7 is a view along the lines VII—VII in FIG. 6.

Referring to FIGS. 6 and 7, there is shown a modification to the embodiment shown in FIGS. 3 and 4. FIG. 6 shows a first magnet means in the form of ferromagnetic yoke 234 having radially inwardly extending arms 236 extending from the opposite poles of a magnet 238. Each arm 236 comprises a first portion 236A extending radially inwardly from the magnet 238 and a second portion 236B angled relative to the first portion 236A such that the second portions 236B extend towards each other. The ferromagnetic yoke 234 is intended to replace the magnet 138 in FIGS. 3 and 4. In this embodiment, the yoke 238 is mounted to the casing at a pivot 239 (see FIG. 7). The yoke 234 is operatively connected to a valve shown schematically at 240. The valve 240 controls the flow of fluid into and out of a chamber. The chamber operates in generally the same way as the chambers 136 in FIGS. 3 and 4 and is not shown in FIGS. 6 and 7 for reasons of clarity.

The turbine blades shown schematically at 26 rotate in the direction of the arrow X in FIG. 7. Each turbine blade 26 is provided with a triangular protrusion 242 which extends into the space 244 between the arms 236 of the yoke 234. The movement of the turbine blades 26 radially outwardly, i.e. towards the yoke 234 as shown by the arrow Y, reduces the distance between the arms 236 of the yoke 234 and the protrusion 242 thereby increasing the drag force on the yoke 234. This pivotally moves the yoke 234 about the pivot 239 towards the valve 240, thereby operating the valve 240 to reduce or prevent the flow of high pressure air into chamber (not shown), and increasing the gap in the same manner as described above. Conversely, when the turbine blades 26 move radially inwardly in the opposite direction to the arrow Y, the distance between the triangular protrusion 242 and the arms of the yoke increases thereby reducing the drag force on the yoke 234 and allowing it to pivot in the opposite direction, thereby operating the valve 240 to allow high pressure fluid to enter the chamber to decrease the gap. Urging means, for example a spring, may be provided to move the yoke 234 in the opposite direction.

Figure 8:
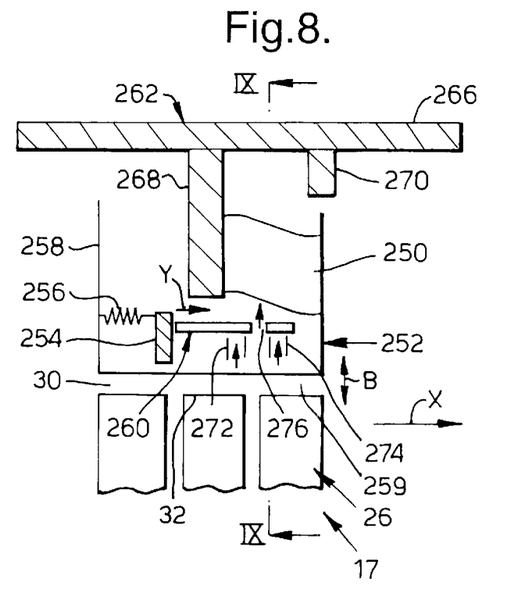
FIG. 8 is diagrammatic plan view of part of a turbine showing another embodiment of a control arrangement.
Figure 9:
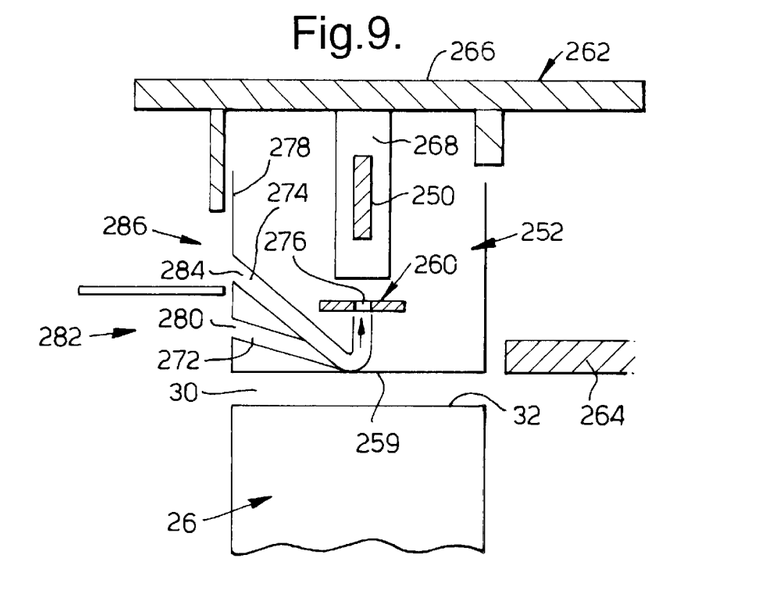
FIG. 9 is a view along the line, IX—IX of FIG. 8.

Referring to FIGS. 8 and 9, there is shown a further embodiment, which utilises a thermo-deformable member in the form of a bi-metallic leaf spring 250. The spring 250 is mounted within a chamber 252 which is moveable radially in opposite directions as indicated by the double headed arrow B on action of the bi-metallic spring 250. A magnet 254 is connected to a side wall 258 of the chamber 252 by resilient urging means in the form of a spring 256. The magnet 254 is also connected to a sliding valve mechanism 260 having an opening 276 through which hot or cold air can pass, as will be described below. The chamber 252 is held within a casing 262 comprising an inner wall 264 (see FIG. 9) and an outer wall 266.

A support member 268 extends radially inwardly from the outer wall 266 into the chamber 252, and the bi-metallic spring 250 extends between the support member 268 and a side wall of the chamber 252. A stop member 270 also extends radially inwardly of the outer wall 266 and can engage the chamber 252 restricting radially outward movement thereof. A plurality of chambers 252 extend circumferentially around the turbine blades 26, but only one is shown for clarity.

The turbine blades 26 rotate in the direction of the arrow X, in FIG. 8, past the chamber 252. It will be appreciated that rotation of the turbine blades 26 creates a drag force on the magnet 254 in the direction of the arrow Y. The spring 256 exerts a force on the magnet 254 in the opposite direction to the arrow Y.

A hot air conduit 272 and a cold, or cooler, air conduit 274 are connected respectively to supplies of relatively hot and cold air 282, 286 (see FIG. 9), drawn from convenient regions of the engine 10. The conduits 272, 274 are arranged in operative association with the valve mechanism 260, which includes an opening 276 through which air can be directed onto the bi-metallic spring 250.

Referring to FIG. 9, it will be seen that the hot air conduit 272 is connected via an aperture 280 in a side wall 278 of the chamber 252 to a supply 282 of hot air, which may be the air passing through the gap 30. The cold air conduit 274 is connected via an aperture 284 in the side wall 278 to a supply 286 of cold air.

A gap 30 is defined between the tips 32 of the turbine blades 26 and a radially inner wall 259 of the chamber 252, the wall 259 forming part of the inner wall 264. When the turbine is in operation, movement of the tips 32 of the turbine blades 26 towards the wall 259, increases the drag force on the magnet 254, thereby moving the valve mechanism 260 also in the direction of the arrow Y such that the opening 276 is moved towards the cold air inlet 274. This increases the amount of cold air delivered onto the bi-metallic spring 250, causing the bi-metallic spring to move the chamber 252 radially outwardly, thereby increasing the gap 30.

If the gap 30 increases, the drag force acting on the magnet 254 by the rotation of the turbine blades 26 is decreased, and the force acting on the magnet 254 by virtue of the spring 256 moves the magnet 254 and hence the valve mechanism 260 in the direction opposite to the arrow Y, so that the opening 276 moves over the hot air inlet 272. This allows more hot air to be delivered to the bi-metallic spring 250, causing the spring to move the chamber 252 radially inwardly thereby decreasing the gap 30. Under steady conditions of operation of the turbine 17, an equilibrium position of the valve mechanism 260 and of the gap 30 will be established.

Figure 10:
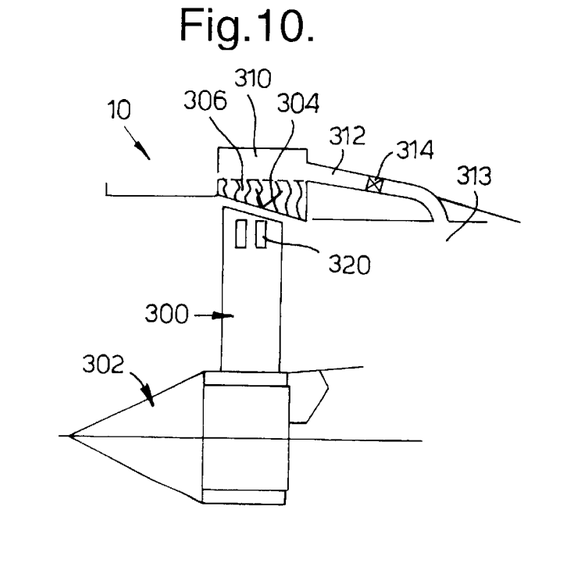
FIG. 10 shows a sectional diagrammatic view of a fan region of a gas turbine engine, showing another embodiment of a control arrangement.
Figure 11:
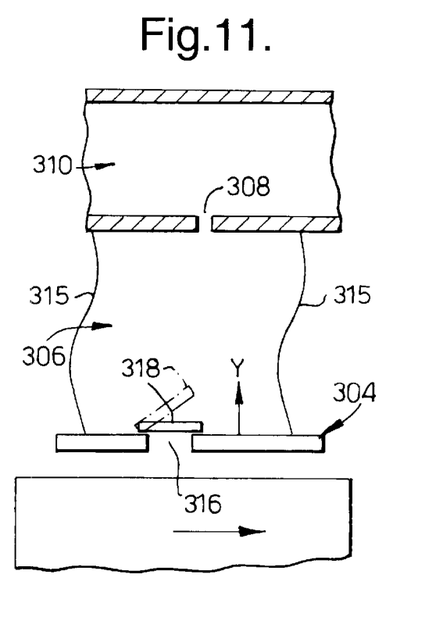
FIG. 11 is a close up view of part of FIG. 10.

Referring to FIGS. 10 and 11, there is shown a further embodiment of the invention for use in the fan region of the engine 10. In this embodiment, a plurality of fan blades 300 are mounted on a rotor 302, and a casing 304 circumferentially surrounds the fan blades 300. The casing 304 is in the form of a senior semi-rigid membrane. A plurality of pressure chambers 306 extend radially outwardly from the casing 304. Each pressure chamber 306 is connected via an aperture 308 to a plenum chamber 310. The plenum chamber 310 is connected via conduits 312 to a region 313 of high pressure at an appropriate part of the engine 10, in this case, the down stream side of the fan assembly. The conduits 312 are provided with flow restrictors or pressure regulators 314 to control the flow of air from the high pressure region 313.

Each pressure chamber 306 is defined by walls 315 which are deformable and resiliently urge the casing 304 radially outwardly in the direction indicated by the arrow Y. The walls 315 are formed of a flexible material, for example a fabric. Alternatively, the walls 315 may comprise a concertina construction, having a plurality of adjacent openable and closeable pleats. In the case of walls 315 of a concertina construction, the walls 315 may be formed of a metal, for example a super elastic alloy.

The casing 304 defines respective apertures 316 for each of the chambers 306. Each aperture 316 is covered by a magnet 318 which may be in the form of flexible magnetic strip, moveable between a closed position as shown in solid lines in FIG. 11 and an open position, as shown is dotted lines in FIG. 11. Magnets 320 are also provided adjacent the tips of the fan blades 300. Alternatively, the fan blades 300 could be formed of an electroconductive material.

In operation, pressurised air is allowed to pass into the plenum chamber 310 from the region 313 of high pressure by the flow regulators 314 and thereafter, into the pressure chambers 306. The pressure of the air in the chambers 306 deforms the walls 315 to move the casing 304 radially inwardly towards the tips of the fan blades 300.

On rotation of the fan blades 300, the tips have a tendency to move radially outwardly towards the casing 304. As this occurs, the magnets 320 in the fan blades 300 repel the free end of each of the magnets 318 thereby causing each magnet 318 to pivot or deform to the open condition, as shown in dotted lines. This opens the aperture 316 allowing air in the chamber 306 to pass through the aperture 316, thereby decreasing the pressure in the chamber 306 and allowing the resilient walls 315 to move the casing 304 in the direction indicated by the arrow Y. As the casing 304 moves away from the tip of the fan blades 300, the magnet 318 moves towards its closed condition.

If the gap 30 is increased, the repulsive force on the magnet 318 is decreased thereby allowing it to move towards the closed condition to reduce the amount of air passing out through the aperture 316, and increase the pressure in the chamber 306. This moves the casing 304 in the direction opposite to the arrow Y to reduce the gap 30.

Under steady conditions, the magnet 318 will be in a partially open condition, allowing some air to escape from the chamber 306, but also allowing a build up of pressure inside the chamber 306 thereby maintaining a radially inward force on the casing 304 to maintain the gap 30 at a desired distance.

The magnets 318 may be moveable to the closed condition by their own resilience. Alternatively, the magnets 318 may be in the form of rigid magnets which are pivotally connected to the casing 304. In this case, the magnets 318 are moveable to the closed condition by use of biasing means, for example a spring, or by the pressure of the air in the respective pressure chamber 306.

By virtue of the arrangements described above, there are provided simple and effective means for ensuring that the gap between the tips of the turbine, compressor or fan blades and the radially outer casing wall surrounding the blades is maintained substantially constant.

Various modifications can be made without departing from the scope of the invention, for example the second magnet means could be in the form of magnets. Also, in the embodiments shown in FIGS. 2 to 7, the pressurised gas could be replaced by an hydraulic fluid, which would have the advantage of allowing a more rapid response.

Where a bi-metallic spring is employed it may be replaced by a shape memory alloy member which may be a two way shape memory alloy which would give full control over the movement of the chamber 252. Alternatively, the shape memory alloy member may be a one way alloy, in which case resilient urging means would be required to move the chamber 252 in one of the two opposite directions.

In another modification, particularly with reference to FIGS. 2 to 5, the magnet 38 is arranged to open and close an outlet for gas in the chamber 36. In a modification to the arrangement shown in FIGS. 10 and 11 the magnet 318 is arranged to open and close an inlet to the chamber 306.

A further modification is to operate the arrangement using attractive instead of repulsive magnetic forces. The magnets can be permanent or electromagnets.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A control arrangement for controlling the size of the gap between first and second components, the control arrangement comprising first magnet means to be provided on the first component, and second magnet means to be provided to on the second component, the first and second magnet means being in magnetic interaction with each other across the gap, and the arrangement further including control means in operative association with the first magnet means to control the size of the gap, variations in magnetic flux or force across the gap causing the first magnet means to cause the control means to effect relative movement of the first and second components to vary the size of the gap, wherein the first magnet means is movable in a first direction to cause the control means to effect relative movement of the first and second components to increase the gap and in a second direction to cause the control means to effect relative movement of the first and second components to decrease the gap, the first and second magnet means being so arranged that relative movement of the first and second components towards each other moves the first magnet means in the first direction, and relative movement of the first and second components away from each other moves the first magnet means in the second direction wherein the control means includes a chamber to receive a force transmission fluid, one wall of the chamber constituting the first component, and the chamber having at least one inlet means and at least one outlet means through which the fluid can pass, wherein the first magnet means is movable to open or close the inlet means, whereby movement of the first magnet means in the first direction opens the inlet means, and the movement of the first magnet means in the second direction closes the inlet means.

2. A control arrangement according to claim 1 wherein each of the first and second magnet means comprises a magnet or magnetic material.

3. A control arrangement according to claim 1 wherein one of the first and second magnet means comprises a magnet or magnetic material and the other of the first and second magnet means comprises an electrically conductive material, whereby movement of the first and second magnet means relative to each other establishes a magnetic field in the electrically conductive material.

4. A control arrangement according to claim 1, wherein the first magnet means is moveable towards or away from the second magnet means to cause the control means to effect the relative movement of the first and second components.

5. A control arrangement according to claim 4, wherein the first magnet means is repelled by the second magnet means such that the first direction of movement of the first magnet means is away from the second magnet means, and the second direction of movement of the first magnet means is towards the second magnet means.

6. A control arrangement according to claim 1, wherein the first magnet means is moveable generally parallel, or generally tangential, to the second magnet means to cause the control means to effect the relative movement of the first and second components.

7. A control arrangement according to claim 6, wherein the first magnet means experiences a drag force from the second magnet means such that the first direction of movement of the first magnet means is generally in the same direction as that of the second magnet means interacting therewith, and the second direction of movement of the first magnet means is generally in the opposite direction to that of the second magnet means interacting therewith.

8. A control arrangement according to claim 1 wherein the first magnet means includes biasing means to bias the first magnet means in the second direction.

9. A control arrangement according to claim 1 wherein the first magnet means is pivotally mounted to the first component.

10. A control arrangement according to claim 1 wherein the control means includes a chamber to receive a force transmission fluid, one wall of the chamber constituting the first component, and the chamber having at least one inlet means and at least one outlet means through which the fluid can pass.

11. A control arrangement according to claim 1 wherein the control means comprises a chamber mountable in the first component, the chamber having a resiliently deformable side wall and a further wall which can be urged by the deformable side wall away from the first component, and the chamber being in fluid communication via an aperture with a supply of a force transmission fluid to urge the further wall towards the second component, the first magnet means being arranged over the aperture and being moveable on magnetic interaction with the second magnet means to open and close the aperture and control the flow of the force transmission fluid into the chamber.

12. A control arrangement according to claim 11 wherein the aperture is provided in said further wall.

13. A control arrangement according to claim 11 wherein the first magnet means is in the form of a flexible magnet.

14. A rotor assembly for use in a gas turbine engine incorporating a control arrangement as claim in claim 1 wherein one of the first and second components comprises stator means and the other of the first and second components comprises rotor means.

15. A rotor assembly according to claim 14 wherein the rotor means comprises a rotor carrying a plurality of rotor blades, and the stator means includes a stator casing, the first magnet means being provided on the stator casing, and the second magnet means being provided at the radially outer ends of the rotor blades.

16. A rotor assembly according to claim 14 wherein the rotor means comprises a rotor carrying a plurality of rotor blades, and stator means includes a plurality of stator vanes, the first magnet means being provided at a radially inner end of each stator vane and the second magnet means being provided on the rotor.

17. A gas turbine engine comprising a rotor assembly as claimed in claim 14.

18. A control arrangement for controlling the size of the gap between first and second components, the control arrangement comprising first magnet means to be provided on the first component, and second magnet means to be provided to on the second component, the first and second magnet means being in magnetic interaction with each other across the gap, and the arrangement further including control means in operative association with the first magnet means to control the size of the gap, variations in magnetic flux or force across the gap causing the first magnet means to cause the control means to effect relative movement of the first and second components to vary the size of the gap, wherein the first magnet means is movable in a first direction to cause the control means to effect relative movement of the first and second components to increase the gap and in a second direction to cause the control means to effect relative movement of the first and second components to decrease the gap, the first and second magnet means being so arranged that relative movement of the first and second components towards each other moves the first magnet means in the first direction, and relative movement of the first and second components away from each other moves the first magnet means in the second direction wherein the control means includes a chamber to receive a force transmission fluid, one wall of the chamber constituting the first component, and the chamber having at least one inlet means and at least one outlet means through which the fluid can pass, wherein the first magnet means is movable to open or close the outlet, whereby movement of the first magnet means in the first direction closes the outlet means, and movement of the first magnet means in the second direction opens the outlet means.

19. A control arrangement according to claim 10, wherein the inlet means is connectable to a first region comprising fluid at a relatively high pressure, and the outlet means is connected to a second region comprising the fluid at a relatively low pressure.

20. A control arrangement for controlling the size of the gap between first and second components, the control arrangement comprising first magnet means to be provided on the first component, and second magnet means to be provided to on the second component, the first and second magnet means being in magnetic interaction with each other across the gap, and the arrangement further including control means in operative association with the first magnet means to control the size of the gap, variations in magnetic flux or force across the gap causing the first magnet means to cause the control means to effect relative movement of the first and second components to vary the size of the gap, wherein the first magnet means is movable in a first direction to cause the control means to effect relative movement of the first and second components to increase the gap and in a second direction to cause the control means to effect relative movement of the first and second components to decrease the gap, the first and second magnet means being so arranged that relative movement of the first and second components towards each other moves the first magnet means in the first direction, and relative movement of the first and second components away from each other moves the first magnet means in the second direction wherein the control means includes a chamber to receive a force transmission fluid, one wall of the chamber constituting the first component, and the chamber having at least one inlet means and at least one outlet means through which the fluid can pass, wherein the inlet means is connectable to a first region comprising fluid at a relatively high pressure, and the outlet means is connected to a second region comprising the fluid at a relatively low pressure, wherein the fluid is a gas.

21. A control arrangement for controlling the size of the gap between first and second components, the control arrangement comprising first magnet means to be provided on the first component, and second magnet means to be provided to on the second component, the first and second magnet means being in magnetic interaction with each other across the gap, and the arrangement further including control means in operative association with the first magnet means to control the size of the gap, variations in magnetic flux or force across the gap causing the first magnet means to cause the control means to effect relative movement of the first and second components to vary the size of the gap, wherein the first magnet means is movable in a first direction to cause the control means to effect relative movement of the first and second components to increase the gap and in a second direction to cause the control means to effect relative movement of the first and second components to decrease the gap, the first and second magnet means being so arranged that relative movement of the first and second components towards each other moves the first magnet means in the first direction, and relative movement of the first and second components away from each other moves the first magnet means in the second direction wherein the control means includes a chamber to receive a force transmission fluid, one wall of the chamber constituting the first component, and the chamber having at least one inlet means and at least one outlet means through which the fluid can pass, wherein the inlet means is connectable to a first region comprising fluid at a relatively high pressure, and the outlet means is connected to a second region comprising the fluid at a relatively low pressure, wherein the fluid is a gas.

22. A control arrangement for controlling the size of the gap between first and second components, the control arrangement comprising first magnet means to be provided on the first component, and second magnet means to be provided to on the second component, the first and second magnet means being in magnetic interaction with each other across the gap, and the arrangement further including control means in operative association with the first magnet means to control the size of the gap, variations in magnetic flux or force across the gap causing the first magnet means to cause the control means to effect relative movement of the first and second components to vary the size of the gap, wherein the first magnet means is movable in a first direction to cause the control means to effect relative movement of the first and second components to increase the gap and in a second direction to cause the control means to effect relative movement of the first and second components to decrease the gap, the first and second magnet means being so arranged that relative movement of the first and second components towards each other moves the first magnet means in the first direction, and relative movement of the first and second components away from each other moves the first magnet means in the second direction, wherein the control means comprises a thermo-deformable member and temperature control means for heating and cooling the thermo-deformable member, movement of the first magnet means in the first direction causing the temperature control means to either heat or cool the thermo-deformable member to do form said member to effect relative movement of the first and second components to decrease or increase the gap.

23. A control arrangement according to claim 22, wherein the thermo-deformable member is selected from a bi-metallic member and a shape memory alloy member.

24. A control arrangement according to claim 23 wherein the shape memory alloy member is formed of a two way shape memory alloy such, and where the thermo-deformable member is a bi-metallic member or a two way shape memory alloy member, thermo-deformable the member is arranged such that heating or cooling the thermo-deformable member causes the thermo-deformable member to deform to effect relative movement of the first and second components to increase or decrease the gap and respective cooling or heating the thermo-deformable member causes said member to deform the effect relative movement of the first and second components to respectively decrease or increase the gap.

25. A control arrangement according to claim 23 wherein the shape memory alloy member is formed of a one way shape memory alloy, heating or cooling the thermo-deformable member causes said member to deform to effect relative movement of the first and second components to increase or decrease the gap, and said arrangement further including force applying means to apply a force to the thermo-deformable member to effect relative movement of the first and second components to respectively decrease or increase the gap.

26. A control arrangement according to claim 23, wherein the temperature control means comprises first and second conduits connectable in fluid communication with respective supplies of hot and cold fluid.

27. A control arrangement according to claim 23, wherein the first magnet means is connected to valve means to control the flow of hot and cold fluid onto the thermo-deformable member.

28. A control arrangement for controlling the size of the gap between first and second components, the control arrangement comprising first magnet means to be provided on the first component, and second magnet means to be provided to on the second component, the first and second magnet means being in magnetic interaction with each other across the gap, and the arrangement further including control means in operative association with the first magnet means to control the size of the gap, variations in magnetic flux or force across the gap causing the first magnet means to cause the control means to effect relative movement of the first and second components to vary the size of the gap, wherein the first magnet means is movable in a first direction to cause the control means to effect relative movement of the first and second components to increase the gap and in a second direction to cause the control means to effect relative movement of the first and second components to decrease the gap, the first and second magnet means being so arranged that relative movement of the first and second components towards each other moves the first magnet means in the first direction, and relative movement of the first and second components away from each other moves the first magnet means in the second direction, wherein the control means comprises a chamber mountable in the first component, the chamber having a resiliently deformable side wall and a further wall which can be urged by the deformable sidewall away from the first component, and the chamber being in fluid communication via a head aperture with a supply of a force transmission fluid to urge the further wall towards the second component, the first magnet means being arranged over the aperture and being movable on magnetic interaction with the second magnet means to open and close the aperture and control the flow of the force transmission fluid into the chamber, wherein the supply of force transmission fluid is a supply of high pressure air.

* * * * *